United States Patent [19]

Fischer et al.

[11] 4,356,058

[45] Oct. 26, 1982

[54] PROCESS FOR THE REPROCESSING OF PAPERS

[75] Inventors: Siegbert Fischer; Lothar Pfalzer, both of Heidenheim, Fed. Rep. of Germany

[73] Assignee: J. M. Voith GmbH, Fed. Rep. of Germany

[21] Appl. No.: 25,930

[22] Filed: Apr. 2, 1979

[30] Foreign Application Priority Data

Apr. 14, 1978 [DE] Fed. Rep. of Germany ....... 2816148

[51] Int. Cl.³ .............................................. D21C 5/02
[52] U.S. Cl. .......................................... 162/5; 162/6; 162/76
[58] Field of Search .............................. 162/5, 4, 6, 76

[56] References Cited

U.S. PATENT DOCUMENTS 1,799,601  4/1931  Neumann .............................. 162/76
3,248,277  4/1966  Gartner et al. .......................... 162/5
3,933,578  1/1976  Kasugai et al. ......................... 162/5

FOREIGN PATENT DOCUMENTS 2628343  1/1977  Fed. Rep. of Germany .......... 162/5
2642319  12/1977  Fed. Rep. of Germany .......... 162/5

*Primary Examiner*—William F. Smith
*Attorney, Agent, or Firm*—Ostrolenk, Faber, Gerb & Soffen

[57] ABSTRACT

Papers containing dye substances in microencapsulated form are reprocessed by dissolving the papers in a pulper in the presence of chemical collectors and/or dispersing agents and in a neutral pH range and then feeding the dissolved pulp to the flotation or washing zone for the addition of a bleaching agent.

6 Claims, No Drawings

PROCESS FOR THE REPROCESSING OF PAPERS

BACKGROUND OF THE INVENTION

Processes for recovering and reprocessing papers which contain ink or dye components, and particularly microencapsulated dyes as are found, for example, in "no-carbon required", i.e. "NCR-type papers" employ bleaching agents after the paper has been dissolved in a pulper in the presence of dispersing agents or by flotation or washing techniques known to the art.

A method for the recovery of papers containing small quantities of dye particles in microcapsules is described in German Provisional Pat. No. 26 42 319. In accordance with this method, it is possible to reprocess recording and carbon papers which contain small quantities of dye particles in microcapsules. The dye particles which are liberated upon the reprocessing are suitably bleached by a hypochlorite bleach. This process has the disadvantage, however, that the paper which thus recovered still has a greenish-blue tinge and its whiteness is still not sufficient for high quality paper. Furthermore, the hypochlorite bleach is not suitable for papers which contain ground wood.

Therefore, the object of the present invention is to create a process in which a higher degree of whiteness of paper is obtained or, where for the same degree of whiteness, there is a saving in chemicals.

SUMMARY OF THE INVENTION

In accordance with the present invention, a paper containing micro-encapsulated dye particles is dissolved in a pulper where the dissolving medium is maintained in the neutral pH range, and where no alkali is added. The dissolved pulp is then transferred to flotation and washing zones and the bleach is then added.

DESCRIPTION OF PREFERRED EMBODIMENTS

Normally, the dissolving of paper in a pulper involves the addition of alkalis, generally caustic soda, with a dwell time of about 15 to 30 minutes at temperatures of about 40° to 60° C.

Surprisingly, it has now been found that, in the presence of alkali, the microencapsulated components or other reactive dye coatings which are found in NCR paper are broken apart or react with each other so that the dyestuffs enter into the suspension. The caustic soda may tend to accelerate the absorption of the dyestuffs on the fibers, whereby they can subsequently only be removed or bleached with difficulty, or by increased additions of chemicals.

By dissolving the NCR papers in a pulper, without the addition of alkali, the disintegration of the capsules, the dye reaction, and the absorption of the dyestuffs on the fibers are substantially prevented. In accordance with the invention, no alkali is added, but the paper is dissolved essentially in a neutral pH range of between about 6.5 and 7.5. Furthermore, the required dwell time in the pulper and the time up to the flotation or washing is kept as short as possible, generally between about 10 to 20 minutes. In this way, it is possible to wash out or float most of the microcapsules unopened so as to prevent a dye reaction. Soluble dyestuffs which remain from printing inks, lacquers, or from the microcapsules are thereupon removed by a suitable bleaching.

By the method of the invention, a paper of greater whiteness is obtained, or a given whiteness can be produced with a reduced quantity of chemicals.

The process of the invention is suitable for the reprocessing of so-called NCR papers which are described in Tappi Vol. 60, No. 5, 1977, S. 84–86, and U.S. Pat. No. 3,525,630, or for coated, printed or varnished paper or cardboard. Furthermore, so-called Xerox papers (natural papers and papers coated with zinc oxide) and so-called thermopapers can also be reprocessed in this way.

The result is further improved if the treatment in the pulper takes place at room temperatures, i.e. between about 15° C. and 25° C. In this way, the action on the microcapsules and the danger of disintegration is further reduced.

In accordance with the invention, it is furthermore contemplated that hypochlorite be used as the bleaching agent. This bleach can be used for ground-wood-free papers.

With ground wood-containing papers, it is advantageous if a multi-step bleaching is effected with dithionite ($Na_2S_2O_4$) and/or hydrogen peroxide.

It is furthermore advantageous for an after-bleaching to be effected with oxalic acid. This method is preferred when the paper appears greenish after the bleaching, the green color being bleached out by the oxalic acid.

A specific embodiment of the invention is described below:

Ground wood-free papers having microencapsulated components (NCR papers) are dissolved in a pulper at room temperature of about 20° C. with sodium soap, with a pulp density of about 4 to 5% and a pH of about 7.25 for 15 minutes. Thereupon a high-density cleaning is effected, in a hydrocyclone, and a despecking is effected before the dissolved substance is floated in a flotation zone.

The suspension is then bleached with 1.5 to 6% NaOCl. In this way, a whiteness of 88.4% is obtained with 1.5% NaOCl, a whiteness of 89.2% with 3.0% NaOCl, and a whiteness of 89.7% with 6.0% NaOCl. The whiteness is measured by the TAPPI standard whiteness test, well known to those skilled in the art.

Although the present invention has been described in connection with a preferred embodiment thereof, many variations and modifications will now be apparent to those skilled in the art. It is preferred, therefore, that the present invention be limited not by the specific disclosure herein, but only by the appended claims.

What is claimed is:

1. In a method for the reprocessing of papers which contain components coated with dyes and/or other substances, particularly microencapsulated components, with the use of bleaching agents and by dissolving the paper in a pulper in the presence of collectors and/or dispersing agents and by flotation or washing, the improvement which comprises (a) dissolving the paper in the pulper at room temperature without addition of alkali and in a neutral pH range of from about 6.5 to 7.5 and a dwell time of about 10 to 20 minutes, whereupon the dissolved pulp is fed to the flotation or washing zone and subsequently treated with a bleaching agent.

2. A process according to claim 1, wherein a hypochlorite is used as the bleaching agent.

3. A process according to claim 1, wherein a multi-step bleaching with dithionite ($Na_2S_2O_4$) and/or hydrogen peroxide is used as the bleaching agent.

4. A process according to claim 1, wherein an after-bleaching is carried out with oxalic acid.

5. A process according to claim 2, wherein an after-bleaching is carried out with oxalic acid.

6. A process according to claim 3, wherein an after-bleaching is carried out with oxalic acid.

* * * * *